United States Patent
Edwards et al.

(10) Patent No.: US 7,376,834 B2
(45) Date of Patent: May 20, 2008

(54) SYSTEM AND METHOD FOR SECURELY CONTROLLING COMMUNICATIONS

(75) Inventors: W. Keith Edwards, San Francisco, CA (US); Mark W. Newman, San Francisco, CA (US); Jana Z. Sedivy, Palo Alto, CA (US); Trevor F. Smith, San Francisco, CA (US); Diana Smetters, San Francisco, CA (US); Dirk Balfanz, Menlo Park, CA (US); Paul Stewart, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 746 days.

(21) Appl. No.: 10/623,296

(22) Filed: Jul. 18, 2003

(65) Prior Publication Data

US 2005/0015595 A1    Jan. 20, 2005

(51) Int. Cl.
*H04L 9/00* (2006.01)
*H04L 9/32* (2006.01)
*G06F 15/16* (2006.01)

(52) U.S. Cl. ............ 713/168; 713/175; 713/176; 726/28; 726/30; 709/206

(58) Field of Classification Search ........ 713/152, 713/161, 168, 170, 175, 176; 726/27–30; 709/225, 229, 232, 208; 719/319, 320; 700/3, 9; 707/1, 9, 10
See application file for complete search history.

(56) References Cited

U.S. PATENT DOCUMENTS

| | | | | |
|---|---|---|---|---|
| 5,818,447 | A * | 10/1998 | Wolf et al. ............ | 715/752 |
| 5,835,768 | A * | 11/1998 | Miller et al. ........... | 719/320 |
| 5,982,898 | A * | 11/1999 | Hsu et al. .............. | 713/156 |
| 6,289,455 | B1 | 9/2001 | Kocher et al. | |
| 6,530,025 | B1 * | 3/2003 | Nakagawa et al. ...... | 726/4 |
| 6,694,368 | B1 * | 2/2004 | An et al. ................ | 709/227 |
| 6,711,263 | B1 * | 3/2004 | Nordenstam et al. .... | 380/282 |
| 6,871,346 | B1 * | 3/2005 | Kumbalimutt et al. ... | 718/104 |
| 6,907,530 | B2 * | 6/2005 | Wang ..................... | 726/12 |
| 6,938,156 | B2 * | 8/2005 | Wheeler et al. ......... | 713/170 |
| 6,948,060 | B1 * | 9/2005 | Ramanathan ............ | 713/153 |

(Continued)

FOREIGN PATENT DOCUMENTS

EP            1132796 A1 *  9/2001

OTHER PUBLICATIONS

Chess, D. "Security Issues in Mobile Code Systems", Mobile Agents and Security. Jan. 1998. pp. 1-14.*

(Continued)

*Primary Examiner*—Emmanuel L Moise
*Assistant Examiner*—Zachary A Davis
(74) *Attorney, Agent, or Firm*—Park, Vaughan & Fleming LLP

(57) ABSTRACT

System and method for enabling arbitrary components to control communications without having or requiring prior knowledge of each other. The system includes a first component that creates controller objects and provides the objects to other components. The controller objects include instructions which when executed by the other components enable the components to generate user interfaces for controlling the first component. Further, the controller objects are encrypted and are used to authenticate the senders or receivers of the objects.

30 Claims, 12 Drawing Sheets

U.S. PATENT DOCUMENTS

| | | | | |
|---|---|---|---|---|
| 6,986,046 | B1* | 1/2006 | Tuvell et al. | 713/171 |
| 7,069,438 | B2* | 6/2006 | Balabine et al. | 713/168 |
| 7,120,802 | B2* | 10/2006 | Shear et al. | 713/194 |
| 7,133,845 | B1* | 11/2006 | Ginter et al. | 705/51 |
| 7,296,042 | B2* | 11/2007 | Edwards et al. | 707/205 |
| 2002/0032873 | A1* | 3/2002 | Lordemann et al. | 713/201 |
| 2002/0141582 | A1 | 10/2002 | Kocher et al. | |
| 2002/0156795 | A1 | 10/2002 | Edwards et al. | |
| 2004/0024787 | A1* | 2/2004 | Edwards et al. | 707/200 |
| 2004/0064694 | A1* | 4/2004 | Lee et al. | 713/168 |
| 2004/0128508 | A1* | 7/2004 | Wheeler et al. | 713/170 |
| 2004/0230793 | A1* | 11/2004 | Estrada et al. | 713/156 |
| 2004/0236943 | A1* | 11/2004 | Edwards et al. | 713/161 |
| 2005/0021954 | A1* | 1/2005 | Kung | 713/168 |
| 2005/0060549 | A1* | 3/2005 | England et al. | 713/175 |
| 2005/0114666 | A1* | 5/2005 | Sudia | 713/175 |
| 2005/0120212 | A1* | 6/2005 | Kanungo et al. | 713/170 |

OTHER PUBLICATIONS

UPnP Forum. UPnP Device Architecture, Version 1.0, Jun. 8, 2000. 53 pages.*

Kocher et al., "Self-Protecting Digital Content," Cryptography Research, Inc., pp. 1-3 (2002) [Retrieved from the Internet at http://www.cryptography.com/resources/whitepapers/SelfProtectingContent_sum.pdf on Jul. 10, 2003.].

U.S. Appl. No. 10/052,585, filed Jan. 23, 2002 by Newman et al., titled "System and Method for Providing Context Information."

U.S. Appl. No. 10/058,268, filed Jan. 29, 2002 by Edwards et al., titled "System and Method for Enabling Arbitrary Components to Transfer Data Between Each Other."

U.S. Appl. No. 10/212,377, filed Aug. 1, 2002 by Edwards et al., titled "System and Method for Enabling Components on Arbitrary Networks to Communicate."

U.S. Appl. No. 10/212,375, filed Aug. 1, 2002 by Edwards et al., titled "Method and System for Handling Data."

U.S. Appl. No. 10/212,376, filed Aug. 1, 2002 by Edwards et al., titled "System and Method for Controlling Communication."

U.S. Appl. No. 10/442,582, filed May 21, 2003 by Edwards et al., titled "System and Method for Dynamically Enabling Components to Implement Data Transfer Security Mechanisms."

U.S. Appl. No. 10/324,625, filed Dec. 18, 2003 by Edwards et al., titled "System and Method for Assessing Component Capabilities."

* cited by examiner

SYSTEM AND METHOD FOR SECURELY CONTROLLING COMMUNICATIONS

FIELD

This invention relates generally to communication methods and systems, and, more particularly, to a method and system for securely controlling aspects of communication among arbitrary components employing cryptographic techniques with controller objects that include mobile code.

BACKGROUND

Different components, such as machines or applications and file systems operating on machines, cannot communicate unless they are explicitly programmed to understand each other. Domain-specific protocols have been developed that enable components to communicate with each other using a common language to partially deal with this difficulty. Even when components use the same domain-specific protocols, however, they are still limited in the types of communications they can engage in. For instance, components typically employ mechanisms for providing feedback or allowing clients to control some aspect of the component's behavior during interactions with the component. Examples include device control panels, directory/file selection windows or progress bar windows.

Unfortunately, these mechanisms are either inherent to the components themselves or are part of a pre-installed application. In either case, the specific instructions for these mechanisms must be known in advance by a component. This limits the ability for components to interact with each other in an ad hoc manner unless they are explicitly programmed to understand each other's mechanisms and speak the same domain-specific protocols. On the other hand, allowing clients unfettered access to interfaces that could be utilized to control some aspect of the component's behavior would create security risks, especially where sensitive information is involved.

SUMMARY

A system for securely controlling communications in accordance with embodiments of the present invention includes a controller module comprising instructions for controlling a first component, and a second component with a security system that interacts with the controller module to implement a security protocol before a second component can control the first component based on executing the instructions in the controller module.

A method and a program storage device readable by a machine and tangibly embodying a program of instructions executable by the machine for securely controlling communications in accordance with embodiments of the present invention include providing a controller module comprising instructions for controlling a first component, and interacting with the controller module to implement a security protocol before a second component can control the first component based on executing the instructions in the controller module.

The embodiments of the present invention provide controller objects that include mobile code instructions which can be sent to and executed by arbitrary components to control aspects of communications involving components without requiring that the components have prior knowledge of each other. In particular, these controller objects enable arbitrary components to dynamically provide each other with user interfaces as needed to enable the recipients to control communication without needing to have specific, prior knowledge of the components creating or providing the interfaces or the interfaces themselves. Further, the present invention advantageously uses cryptographic techniques, such as encryption and authentication, to restrict the use of the controller objects to particular components or to ensure that the controller objects are sent from trusted sources.

DETAILED DESCRIPTION

Figure 1:
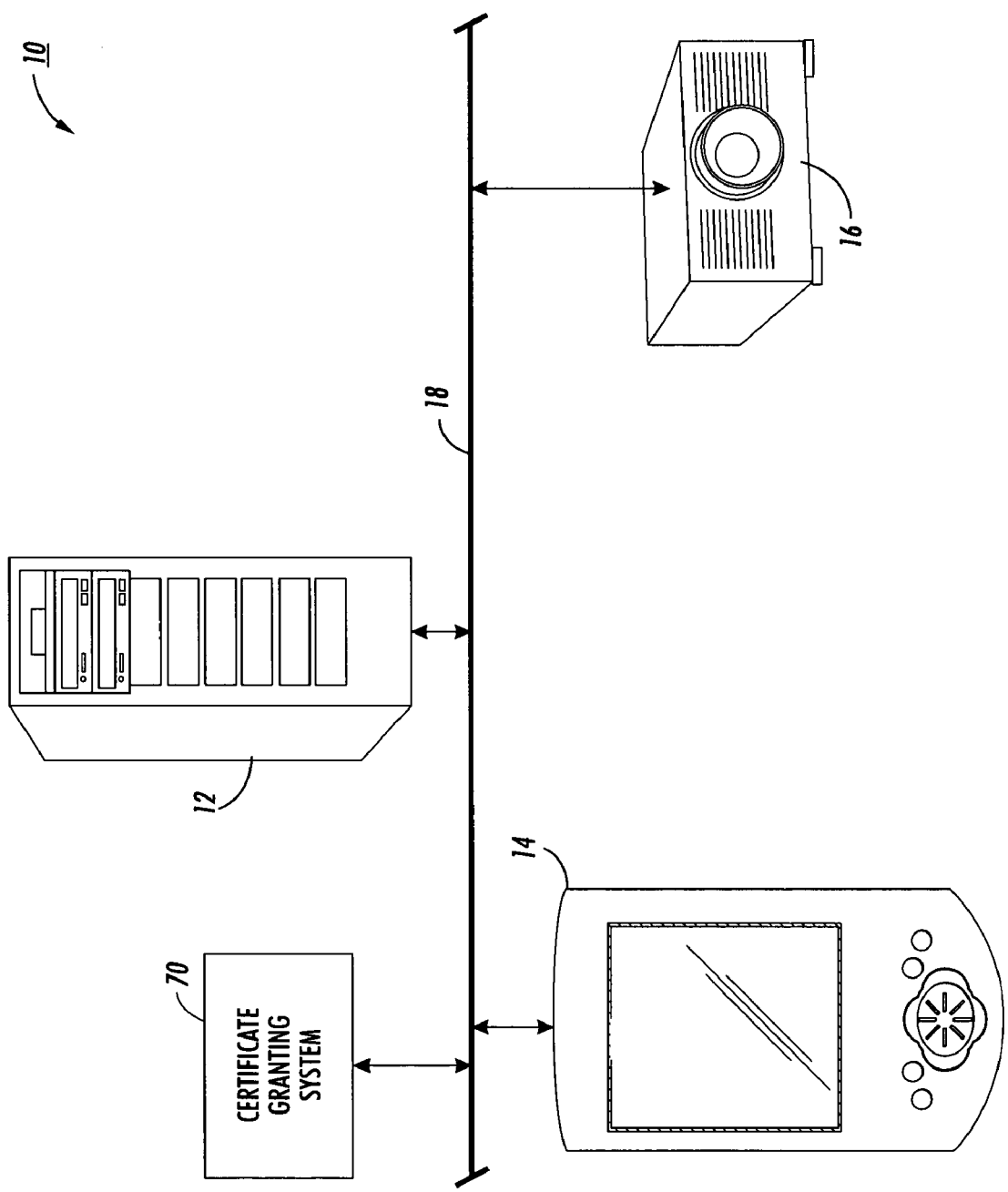
FIG. 1 is a diagram of a system for controlling communication securely in accordance with embodiments of the present invention.

A system 10 for enabling arbitrary components to securely control communication in accordance with embodiments of the present invention is shown in FIG. 1. System 10 includes server 12, personal digital assistant ("PDA") 14, projector 16 and a certificate granting system 70, although the system 10 may include different kinds and numbers of components. The system 10 enables components, such as PDA 14, to securely control aspects of communication with other components, such as projector 16, by executing instructions in a projector controller object 26(3) without needing to have prior knowledge of the projector 16, for example. Moreover, the system 10 employs cryptographic techniques, such as encryption and authentication, in connection with the controller objects to restrict the use of the controller objects to particular components, to ensure that the controller objects are sent from trusted sources, and/or to restrict access to controller objects to particular components.

Referring to FIG. 1, the components in system 10, such as server 12, PDA 14 and projector 16, are communicatively coupled together by the network 18. The term "component" is intended to refer to one or more applications or programs executing on the server 12, PDA 14, and projector 16, such as a slide show program, although components may refer to the actual hardware devices executing those applications. For ease of discussion and illustration, reference will be made generally to the server 12, PDA 14, and projector 16 throughout the embodiments of the present invention, rather than to the specific applications executing on those machines.

Further, the particular types of components described herein in connection with system 10 are provided for exemplary purposes only. By way of example only, the components shown in FIG. 1 may also comprise scanners, lap-top computers, cellular telephones, display devices, video input/output devices, audio input/output devices, copier devices, printer devices, remote control devices, appliances and file systems or databases residing in a computer system.

Figure 2:
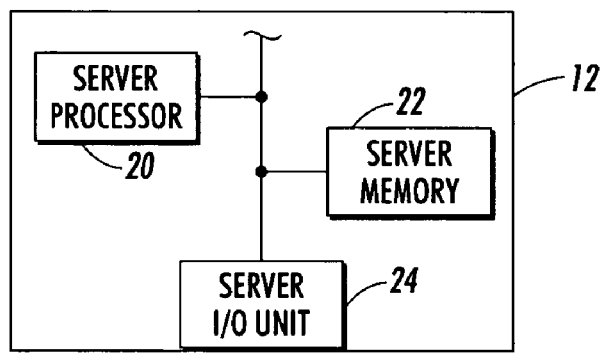
FIGS. 2-4 are block diagrams of the exemplary components used in the system shown in FIG. 1.

Referring to FIG. 2, the server 12 includes a server processor 20, a server memory 22 and a server I/O unit 24, which are coupled together by one or more bus systems or other communication links, although the server 12 can comprise other elements in other arrangements. The server processor 20 executes at least a portion of the programmed instructions to securely control communication in accordance with embodiments of the present invention as described herein and as set forth in FIGS. 5, 9, 10, 12 and 14. These programmed instructions are stored in the server memory 22 for execution by the server processor 20.

The server memory 22 comprises any type of fixed or portable memory accessible by the server processor 20, such as ROM, RAM, SRAM, DRAM, DDRAM, hard and floppy-disks, CDs, DVDs, magnetic tape, optical disk, ferroelectric and ferromagnetic memory, electrically erasable programmable read only memory, flash memory, charge coupled devices, smart cards, or any other type of computer-readable media. The server memory 22 is used to store these programmed instructions as well as other information, although the instructions may be stored elsewhere.

Figure 6:
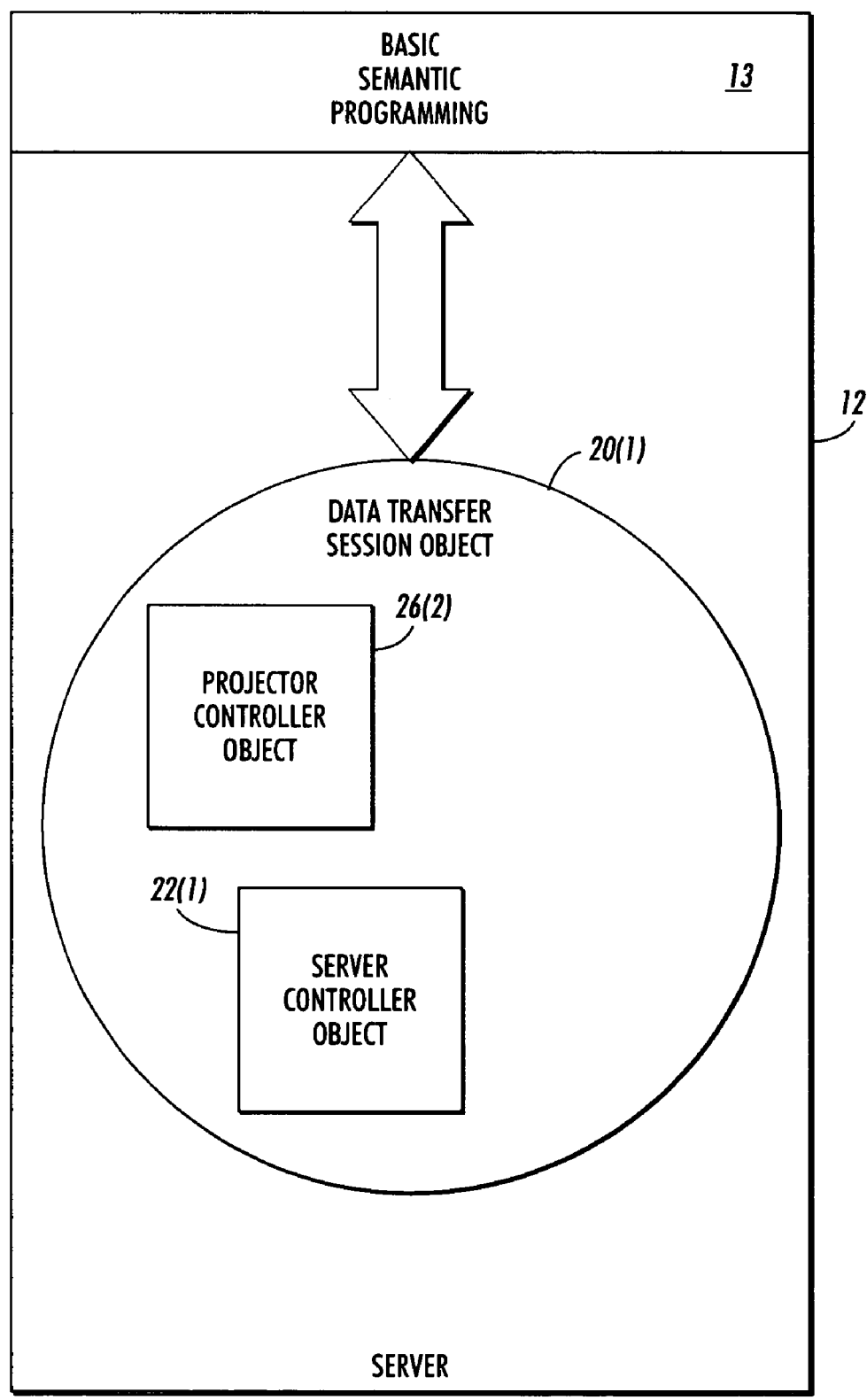
FIGS. 6-8, 11, 13 and 15 are functional block diagrams of portions of a system for controlling communication securely in accordance with embodiments of the present invention.

Additionally, the server memory 22 stores a set of basic semantic programming 13, shown in FIG. 6, comprising instructions which when executed by the server processor 20 enable the server 12 to understand the semantics of a basic set of universal interfaces associated with proxy objects received from other components, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which is incorporated by reference in its entirety. The particular universal interfaces used are responsive to the needs of applications for particular services. However, the basic semantic programming 13 does not need to include the particulars of the specific services involved, just the semantics of the universal interfaces used.

Further, the server memory 22 stores a data source and a data sink interface that it may provide to other components through a server proxy object, although the memory 22 may also store one or more of the other interfaces disclosed in the '933 application to Edwards et al. The server I/O unit 24 is used by the server 12 to operatively couple and communicate with other components, such as the PDA 14 and the projector component 16, over the network 18.

Figure 3:
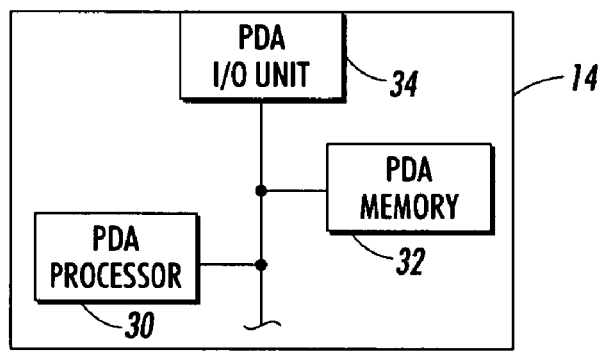

Referring to FIG. 3, PDA 14 includes a PDA processor 30, a PDA memory 32 and a PDA I/O unit 34, which are coupled together by one or more bus systems or other communication links, although the PDA 14 can comprise other elements in other arrangements. The PDA 14 performs a variety of functions, such as information display, electronic messaging, telephony, facsimile transmissions or networking, although the PDA 14 may perform other functions. The PDA processor 30 executes at least a portion of the programmed instructions to securely control communication in accordance with embodiments of the present invention as described herein and as set forth in FIGS. 5, 9, 10, 12 and 14. These programmed instructions are stored in the PDA memory 32 for execution by the PDA processor 30.

The PDA memory 32 is the same type of memory as the server memory 22 used by the server 12. The PDA memory 32 can be used to store these programmed instructions as well as other information, although the instructions may be stored elsewhere. Additionally, the PDA memory 32 stores a set of basic semantic programming 15, shown in FIG. 7, which comprises instructions which when executed by the PDA processor 30 enable the PDA 14 to understand the semantics of a basic set of universal interfaces associated with proxy objects received from other components. Further, the PDA memory 32 stores a data source and a data sink interface that it may provide to other components through a PDA proxy object, although the memory 32 may also store one or more of the other interfaces disclosed in the '933 application to Edwards et al. The PDA I/O unit 34 is used by the PDA 14 to operatively couple and communicate with other components, such as the server 12 and the projector 16, over the network 18.

Figure 4:
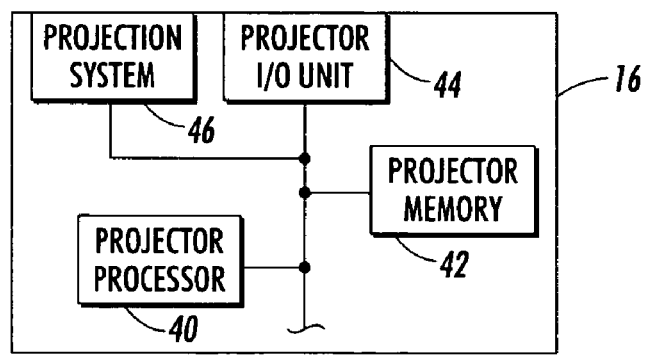

Referring to FIG. 4, the projector 16 includes a projector processor 40, a projector memory 42, a projector I/O unit 44 and a projection system 46, which are coupled together by one or more bus systems or other communication links, although the projector 16 can comprise other elements in other arrangements, such as having one or more of the projector processor 40, projector memory 42, and the projector I/O unit 44 located externally to the projector 16. The projector 16 can project images using the projection system 46, such as text and/or graphics, onto a fixed medium, such as a projection screen, although the projector 16 could have other functions. The projector processor 40 executes at least a portion of the programmed instructions to securely control communication in accordance with embodiments of the present invention as described herein and as set forth in FIGS. 5, 9, 10, 12 and 14. These programmed instructions are stored in the projector memory 42 for execution by the projector processor 40.

The projector memory 42 is the same type of memory as the server memory 22 used by the server 12. The projector memory 42 can be used to store these programmed instructions as well as other information, although the instructions may be stored elsewhere. Additionally, the projector memory 42 stores a set of basic semantic programming 17, shown in FIG. 8, which comprises instructions which when executed by the projector processor 40 enable the projector 16 to understand the semantics of a basic set of universal interfaces associated with proxy objects received from other components. Further, the projector memory 42 stores a data source and a data sink interface that it may provide to other components through a projector proxy object, although the memory 42 may also store one or more of the other interfaces disclosed in the '933 application to Edwards et al. The projector I/O unit 44 is used by the projector 16 to operatively couple and communicate with other components, such as the server 12, over the network 18.

Referring back to FIG. 1, the certificate granting system 70 comprises a credential issuing authority infrastructure, such as VeriSign®, that issues and manages security credentials, such as digital certificates and public keys for the encryption and decryption of content, such as data and electronic documents, for example, as part of a public key infrastructure ("PKI"), although other types of cryptographic credentials may be used. Further, the certificate granting system 70 has access to the network 18 and can issue credentials to one or more components on the network 18, such as the server 12, for example. Since certificate granting systems 70 are well known in the art, the specific elements, their arrangement within the system 70 and operation will not be described in detail herein.

The network 18 enables components in the system 10, such as the server 12, PDA 14, projector 16 and certificate granting system 70, to communicate with each other and any other components with access to network 18 using a TCP/IP protocol, although other protocols may be used. In embodiments of the present invention, the network 18 comprises the Internet, although other types of networks 18 may be used, such as Intranets (e.g., LANs, WANs), and telephone line, coaxial cable, wireless and ISDN networks, and combinations thereof.

A portion of the operation of the system 10 for enabling arbitrary components to securely control communication in accordance with embodiments of the present invention will now be described with reference to FIGS. 5-8. By way of example only, a user of the PDA 14 may desire accessing a slide show program, such as MS PowerPoint™, operating on the server 12. Further, the user of the PDA 14 may desire displaying the slide show using a suitable device, such as the projector 16.

Figure 5:
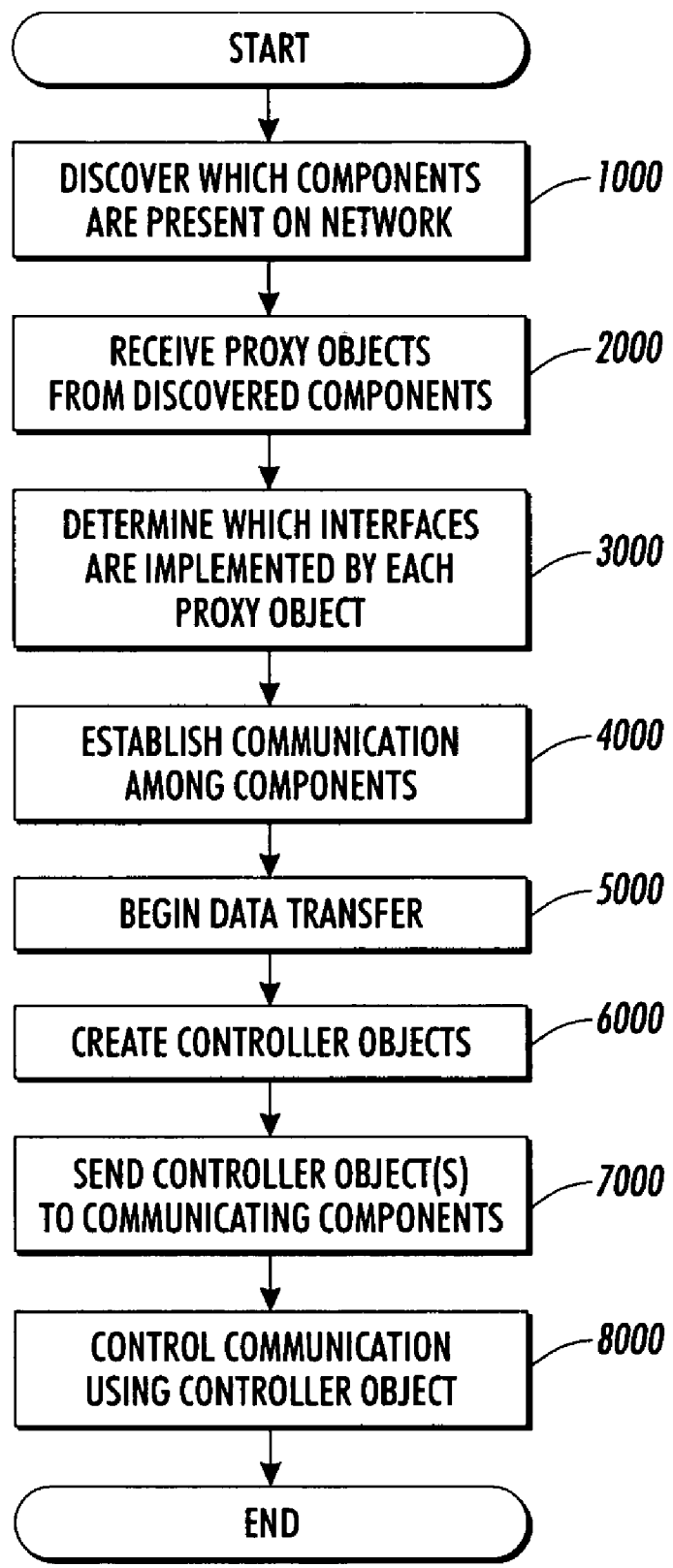
FIGS. 5, 9-10, 12, and 14 are flow charts of portions of a process for controlling communication securely in accordance with embodiments of the present invention.

Referring to FIG. 5 and beginning at step 1000, PDA 14 performs a discovery process to determine which components are present on the network 18 and what their communication capabilities are. In embodiments of the present invention, PDA 14 at least discovers server 12 and projector 16 using a Jini™ system discovery protocol, although a variety of other discovery protocols may be used, such as Bluetooth™ SLP, UDDI, or simple lookup in a name server, for example, as disclosed in the '933 application to Edwards et al. The PDA 14 automatically performs the discovery process upon the user expressing a desire to establish a particular type of communication, such as a data transfer, for transferring stored slides from server 12 to projector 16 for display thereon, although the PDA 14 may be programmed to allow the user to manually initiate the discovery process.

At step 2000, server 12 returns a server proxy object to PDA 14, and projector 16 returns a projector proxy object to PDA 14, which are both stored in the PDA memory 32, although the objects may be stored elsewhere that is accessible to the PDA 14. Each proxy object includes one or more of the universal interfaces mentioned above (e.g., data sink, data source) that are associated with the particular component each proxy object is received from, in this particular example server 12 and projector 16, thereby making the interfaces and their respective operations, instructions and data accessible to the receiving component, such as PDA 14.

The server, PDA and projector proxy objects and their associated interfaces, operations and instructions, as well as any other interfaces, operations and instructions that may be subsequently described herein, comprise mobile code, such as JAVA, although other languages may be used, such as Smalltalk, CLOS, Ada or Object Pascal. Mobile code is executable content that can be transmitted to components, such as server 12, PDA 14 or projector 16, where it is executed. In embodiments of the present invention, the mobile code is object-oriented, although the mobile code may be procedure-oriented, logic-oriented, rule-oriented or constraint-oriented.

At step 3000, PDA 14 inspects each received proxy object to determine which universal interfaces server 12 and projector 16 implement. PDA 14 determines that the server proxy object implements at least a data source interface and that the projector 16 proxy object at least implements a data sink interface. In this example, PDA 14 invokes the data source interface associated with server 12 and the data sink interface associated with the projector 16, and the instructions, operations and data included in the interfaces become available to PDA 14.

Figure 7:
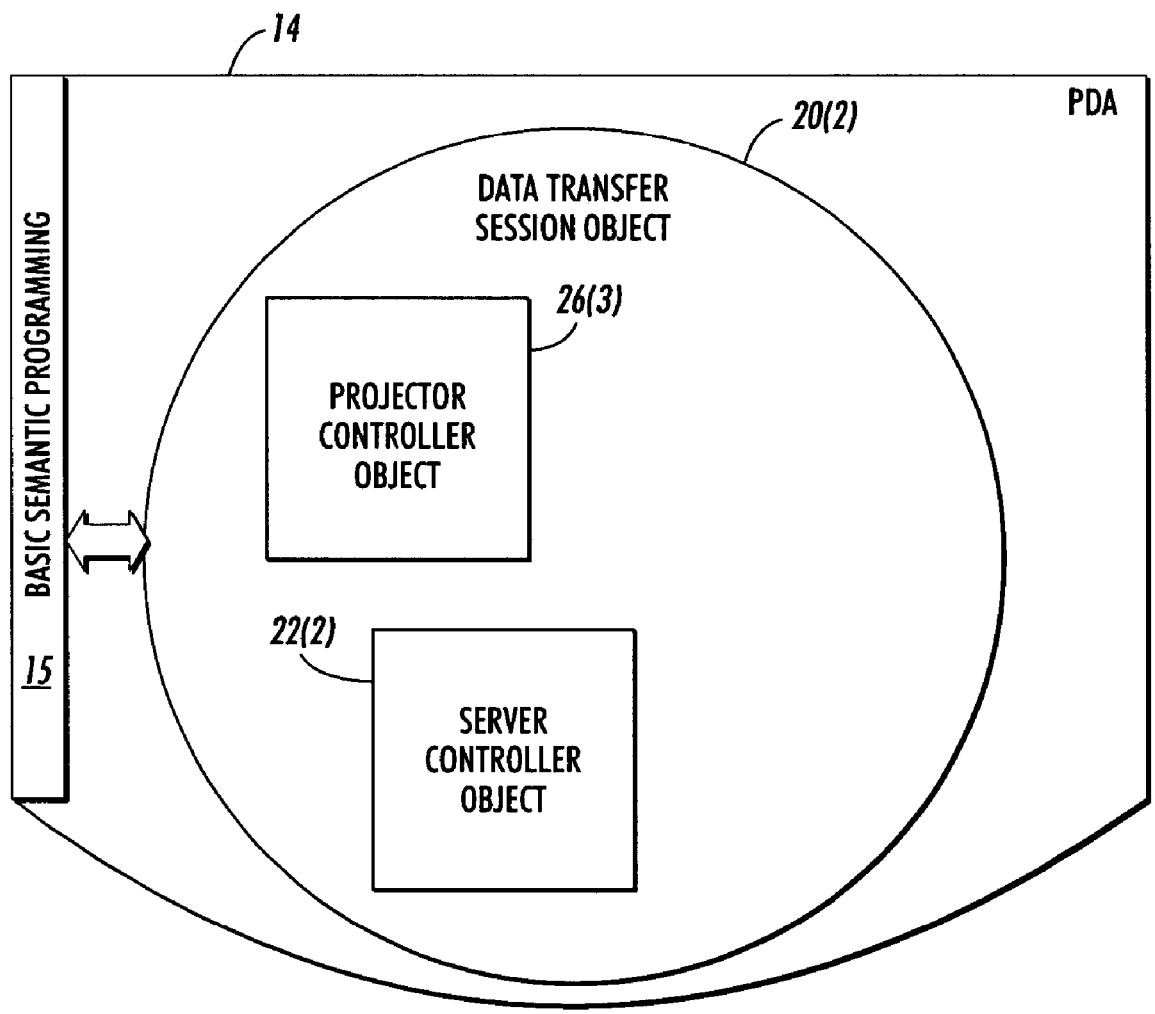
Figure 8:
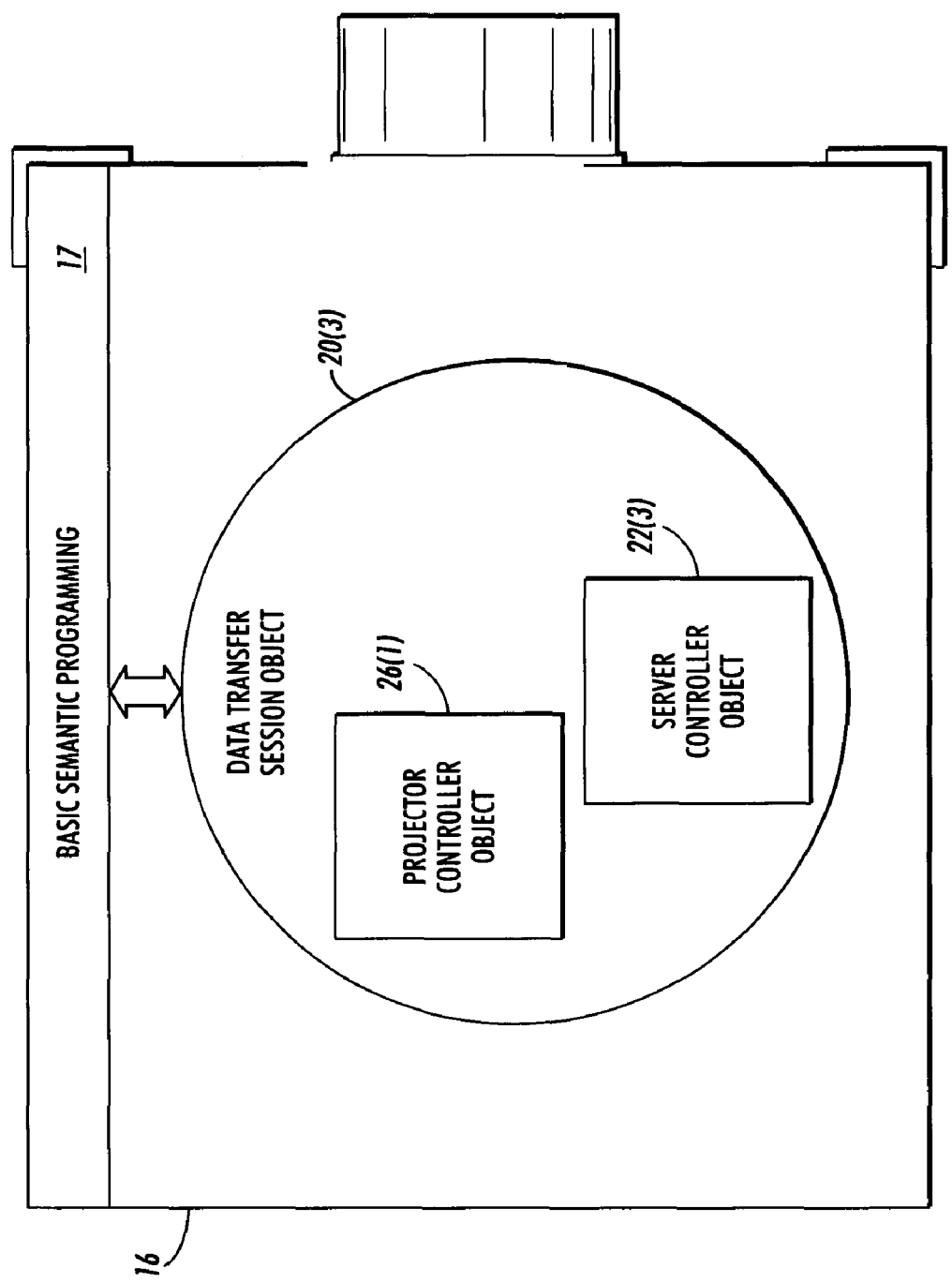

At step 4000 and referring to FIGS. 6-8, the PDA 14 establishes a data transfer session among server 12, PDA 14 and projector 16, although the session may involve other types of communications, such as transferring contextual data or providing event notifications. PDA 14 executes a begin TransferSession( ) operation included in the data source interface associated with server 12. The begin TransferSession( ) operation includes operations, instructions and data that may be executed by PDA 14 to request the server 12 to communicate with the PDA 14. In response, the server 12 sends a copy of the data transfer session object 20(1) to the PDA 14 using a TCP/IP communication protocol, which is shown as data transfer session object 20(2) in FIG. 7, although other protocols can be used, such as RPC, CORBA, SOAP and RMI. The data transfer session object 20(2) includes instructions, operations and data that are specific to the server 12, but may be understood and executed by components having access to a copy of the object 20(1), such as the PDA 14.

Next, PDA 14 executes a Transfer( ) operation included in the data sink interface associated with the projector 16. The Transfer( ) operation includes operations, instructions and data that may be understood and executed by PDA 14 to request projector 16 to participate in a data transfer with the server 12 and the PDA 14. The PDA 14 passes a copy of the data transfer session object 20(2) into the Transfer( ) operation call to make the object 20(2) accessible to the projector 16, which is shown as data transfer session object 20(3) in FIG. 8, respectively, to enable the projector 16 to communicate with the server 12.

The PDA 14 may also invoke a data sink interface associated with the server 12 so it may execute a Transfer( ) operation to pass its own data transfer session object (not illustrated) to server 12 for transmitting data to the server 12 if necessary during operation of the slide show program in this example. Likewise, the projector 16 may also invoke a data sink interface associated with the server 12 or the PDA 14 and execute a Transfer( ) operation to pass its own data transfer session object (not illustrated) to server 12 for transmitting data to the server 12 if necessary during operation of the exemplary slide show program.

At step 5000, PDA 14 optionally executes the getTransferData( ) operation included in the data transfer session object 20(2) to retrieve data from server 12. The PDA 14 begins retrieving data from the server 12 upon receiving user input through an input device, such as a mouse or keypad, indicating a user's desire to begin data transfer, although the PDA 14 may begin upon initially receiving the data transfer session object 20(2). Referring back to the example provided above in connection with step 1000, the PDA 14 receives from the server 12 data representing executable content that is executed by the PDA 14 to access and display on a display of the PDA 14 a slide show, although any other component having a copy of the data transfer session object 20(1) can also run the executable content to access and display the show.

Additionally, the projector 16 optionally executes a getTransferData( ) operation included in the data transfer session object 20(3) to retrieve data from server 12. The projector 16 begins retrieving data from the server 12, although the projector 16 can begin retrieving data upon detecting that data is being sent from the server 12 or upon receiving a signal from the PDA 14 indicating a user's desire to begin data transfer. The server 12 also transmits data to the projector 16 through the data transfer session object 20(3). In particular, the projector 16 receives from the server 12 data representing the MS PowerPoint™ slides to be displayed by the projector 16, and the projector 16 projects the slide images represented by the data being received.

At step 6000, the server 12 creates a server controller object 22(1), shown in FIG. 6, which is stored in server memory 22 for further processing as described herein. The server controller object 22(1) includes mobile code instructions that may be executed by components, such as PDA 14 and projector 16, to generate custom user interfaces with respect to the component that creates the controller object 22(1), such as the server 12 in this particular example. The instructions included in the server controller object 22(1) are specific to the server 12, yet may be understood and executed by the recipients of the object 22(1) copies, such as PDA 14 or projector 16. Additionally, projector 16 creates a projector controller object 26(1), shown in FIG. 8, in the same manner described above in connection with the server 12 creating a server controller object 22(1), except the projector 16 associates the projector controller object 26(1) with the data transfer session object 20(3) and the instructions in the object 26(1) are specific to the projector 16.

At step 7000, server 12 "pushes" the copies of the server controller object 22(1) onto the components involved in the communication established at step 4000 by executing an addController( ) operation on the data transfer session object 20(1) and passing in the controller object 22(1), although components may request the controller objects as needed. In particular, the server 12 sends an asynchronous event notification using a TCP/IP communications protocol to the components having access to a copy of the data transfer session object 20(1), such as PDA 14 and server 16, although other protocols can be used, such as RPC, CORBA, SOAP, and RMI.

The notification includes a copy of the controller object 22(1) and indicates that one or more of the components holding a copy of the session object 20(1), such as server 12, has created the server controller object 22(1) and has associated it with the session object 20(1), although the notification may not include a copy of the controller object 22(1) where the components can "fetch" a copy of the object. The components receive the notification sent from server 12 as described above and extract from it a copy of the server controller object 22(1), shown as 22(2) and 22(3) in FIGS. 7-8. The projector 16 pushes the copies of the projector controller object 26(1) onto the components involved in the communication established at step 4000, shown as projector controller objects 26(2) and 26(3) in FIGS. 6-7, in the same manner described above with respect to pushing copies of the server controller object 22(1).

At step 8000, the PDA 14 accesses the server controller object 22(2) and executes the instructions included in the controller object 22(2) for generating and displaying one or more user interfaces specific for the server 12, such as buttons, which may be interacted with by the users to enable them to advance the slides in the exemplary slide show program. For instance, a user may manipulate an input device associated with the PDA 14, such as a mouse or joystick, to move a displayed graphical cursor for interacting with the user interfaces generated by executing the server controller object 22(2). The user interactions are communicated back to the controller object 22(1) at the server 12 using a TCP/IP communication protocol, although other protocols can be used, such as RPC, CORBA, SOAP and RMI. The server 12 executes the instructions to effect any changes resulting from the interactions, such as displaying a next slide in the slide show.

Further, the PDA 14 executes instructions included in the server controller object 22(2) that cause the PDA 14 to send a message to the creator of the controller object 22(2), such as the server 12 in this particular example, informing the server 12 that the PDA 14 has generated and executed the server controller object 22(2), although the instructions may cause the PDA 14 to send a message to any of the components holding a copy of the data transfer session object 22(1) as well. Such as message is sent using a TCP/IP communication protocol, although other protocols can be used, such as RPC, CORBA, SOAP and RMI.

Additionally, the PDA 14 executes the instructions included in the projector controller object 26(3) for generating and displaying user interfaces, such as a sound control interface that may be utilized by the users to control the volume of the projector 16. Again, a user of the PDA 14 may manipulate an input device, such as a mouse or joystick, to move a displayed graphical cursor for interacting with the generated interface to adjust the volume of an audio output device, such as a speaker, associated with the projector 16, for example. The changes made by the user interacting with the interface are communicated back to the projector controller object 26(1) or directly to the projector 16 in the same manner described above in connection with the server controller object 22(1).

The PDA 14 may also send a notification to the projector 16 that it has generated a user interface or that it no longer needs the projector controller object 26(3) for the data transfer so that the projector 16 may become available for participating in data transfers or other types of communications with other components. Once the server 12 and/or PDA 14 have sent all of the data to the projector 16 or one or more components desire terminating the communication session and/or the data transfer, the process ends.

Another portion of the process for the operation of the system 10 to securely control communication in accordance with embodiments of the present invention will now be described with reference to FIGS. 5 and 9-11. In this example, the server 12 may desire restricting access to the controller object 22(1) to just one component, such as the PDA 14. Steps 1000-6000 are performed in the same manner described above, except step 6000 is performed in conjunction with steps 6100-6200 as described herein. Further in this example, the PDA 14 stores a first cryptographic key 50, shown in FIG. 11, in a protected area of the PDA memory 32. The PDA 14 obtains the first cryptographic key 50 from the certificate granting system 70, although the key 50 may be pre-installed in the PDA 14 during manufacturing or the key 50 may be generated by the PDA 14.

Figure 9:
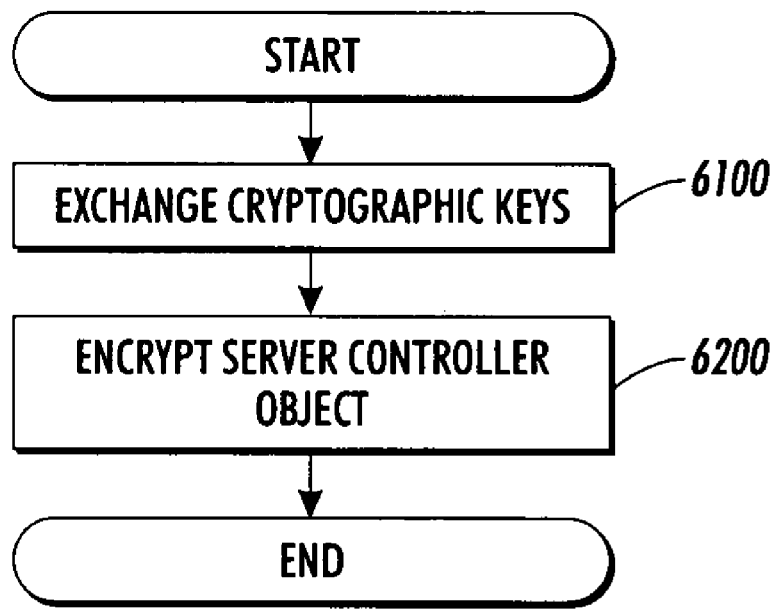

Referring to FIG. 9, at step 6100, the PDA 14 provides the server 12 with a second cryptographic key 52 which corresponds to the first cryptographic key 50 stored in the protected area of the PDA memory 32 either before or after the server controller object 22(1) is created at step 6000. At step 6200, once the server controller object 22(1) is created, the server 12 encrypts the object 22(1) using the second cryptographic key 52 of the PDA 14 to create an encrypted server controller object 22(1)'. Thereafter, step 7000 is performed in the same manner described above, except a copy of the encrypted server controller object 22(1)' is sent to the PDA 14 and the projector 16, shown as encrypted objects 22(2)' and 22(3)' in FIG. 11. Steps 7100-7200 are then performed as described herein.

Figure 10:
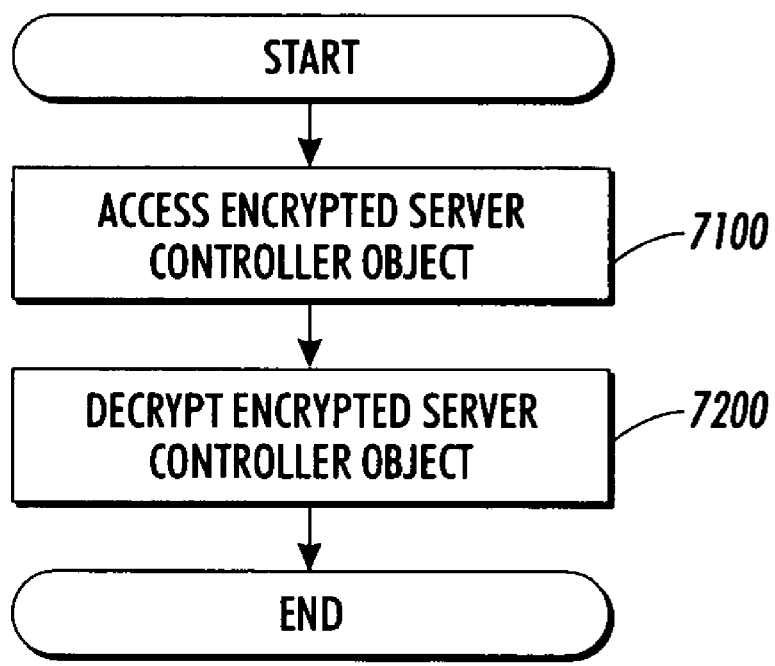
Figure 11:
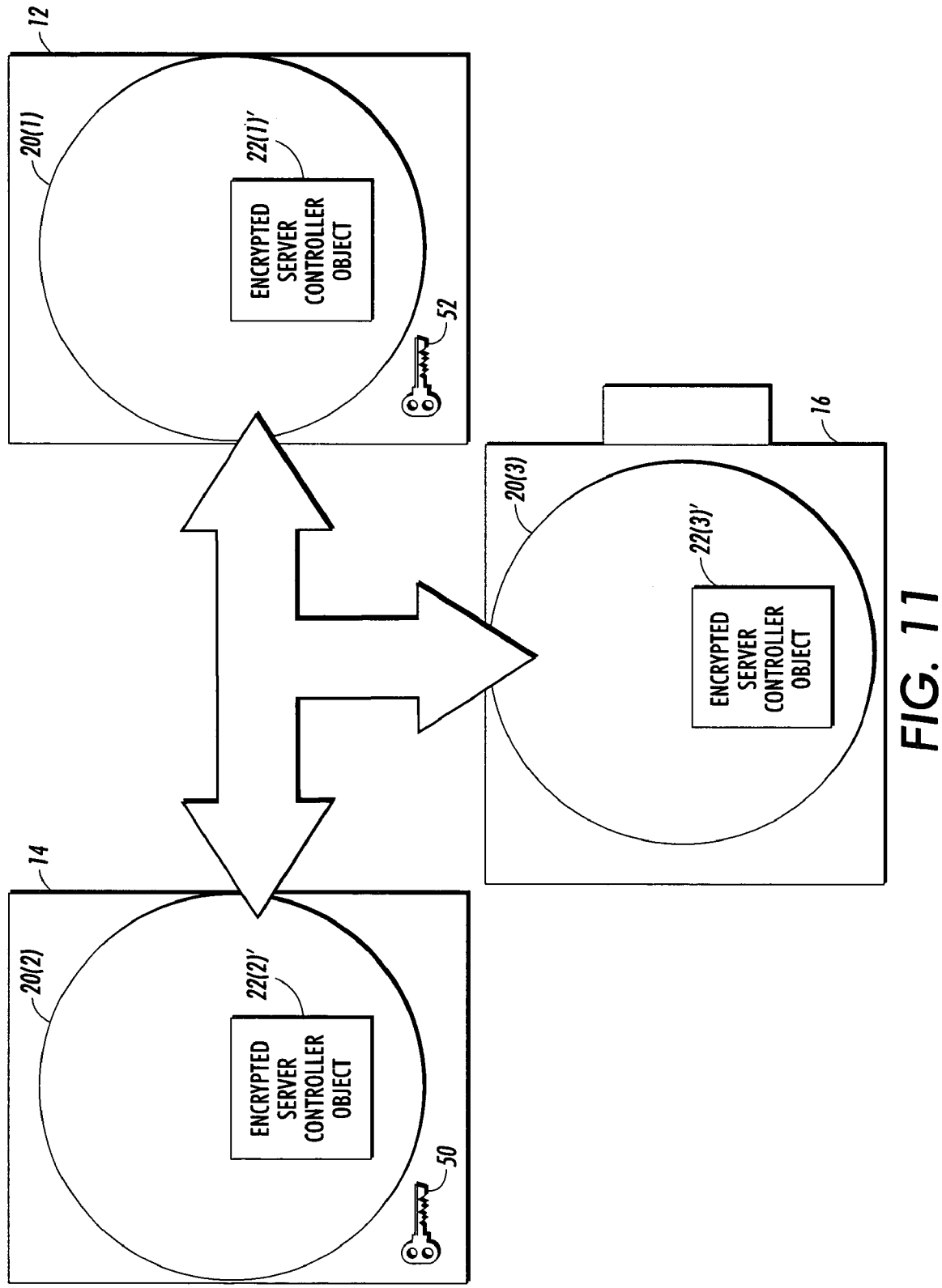

Referring to FIG. 10, at step 7100, the PDA 14 accesses the encrypted server controller object 22(2)' and detects that the object 22(2)' is encrypted. At step 7200, the PDA 14 retrieves the first cryptographic key 50 from the protected area of the PDA memory 32 and uses the key 50 to decrypt the encrypted server controller object 22(2)'. Thereafter, the PDA 14 executes the instructions included in the decrypted server controller object to generate user interfaces as described above in connection with step 8000. Further, if the projector 16 attempts to access the encrypted server controller object 22(3)', it will also detect that the object 22(3)' is encrypted but will not be able to decrypt the object since the projector 16 does not possess a second corresponding cryptographic key of the first cryptographic key 50 associated with the PDA 14. Therefore, access to the encrypted server controller object 22(2)' in this example is limited to just the desired components (i.e., PDA 14) which possess the cryptographic keys corresponding to the keys used to encrypt the controller objects.

An alternative portion of the process for the operation of the system 10 to securely control communication in accordance with embodiments of the present invention will now be described with reference to FIGS. 5 and 12-13. In this example, the server 12 may desire restricting access to controller objects it provides to other components without having to store keys of all the components. Steps 1000-7000 are performed in the same manner described above, except as described herein.

At step 6000, the server 12 creates an authentication controller object 60(1) instead of the server controller object 22(1), although the controller object 60(1) may be created in addition to the controller object 22(1). The authentication controller object 60(1) is identical to the server controller object 22(1), except the authentication object 60(1) includes mobile code authentication instructions 62(1) and mobile code controller instructions 64(1), although the authentication object 60(1) may include just the mobile code authentication instructions 62(1). The mobile code authentication instructions 62(1) comprise instructions which when executed by components, such as PDA 14 and/or projector 16, cause the executing components to provide authentication information to a component, such as the server 12. The mobile code controller instructions 64(1) comprises instructions for generating and displaying one or more user interfaces.

Figure 13:
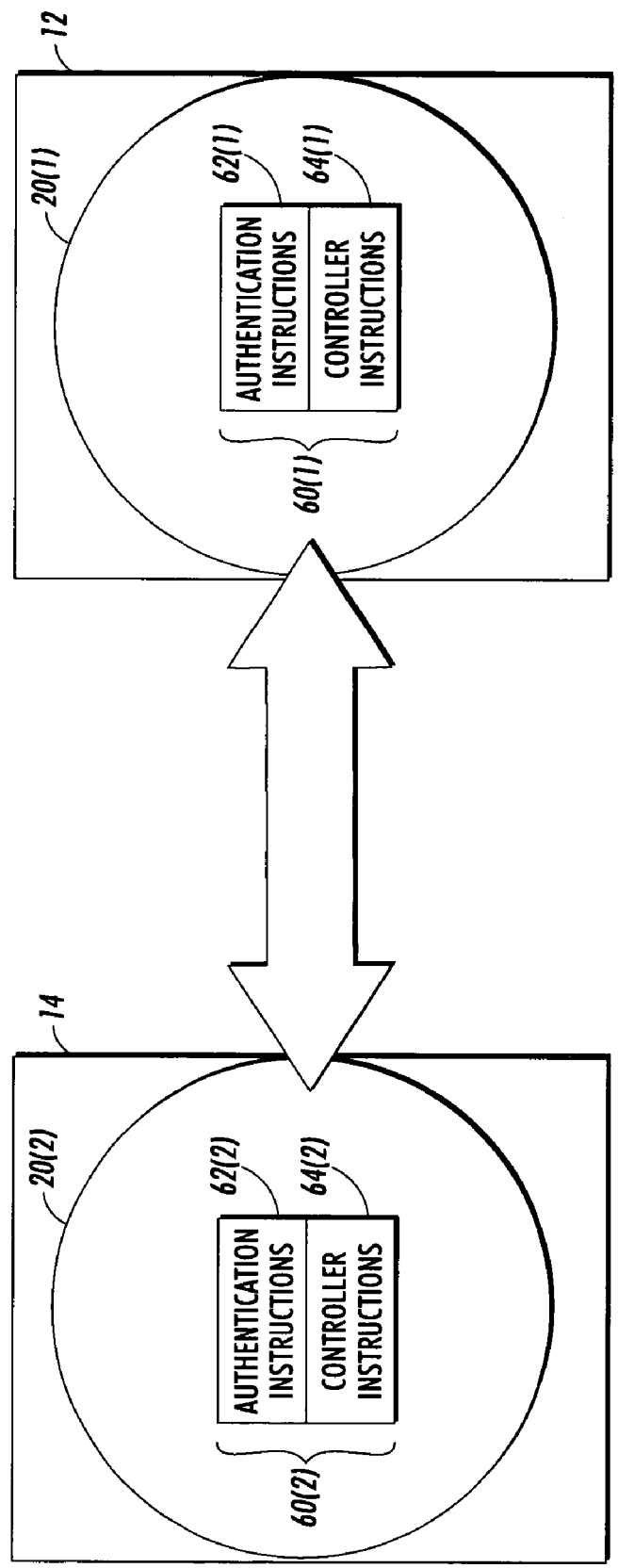

In this example, at step 7000, the server 12 sends a copy of the authentication controller object 60(1) to the PDA 14 and the projector 16 instead of the server controller object 22(1), shown as authentication controller object 60(2) in FIG. 13, although the authentication object 60(1) may be sent before or with the server controller object 22(1). In this example, steps 8100-8400 are performed prior to performing step 8000.

Figure 12:
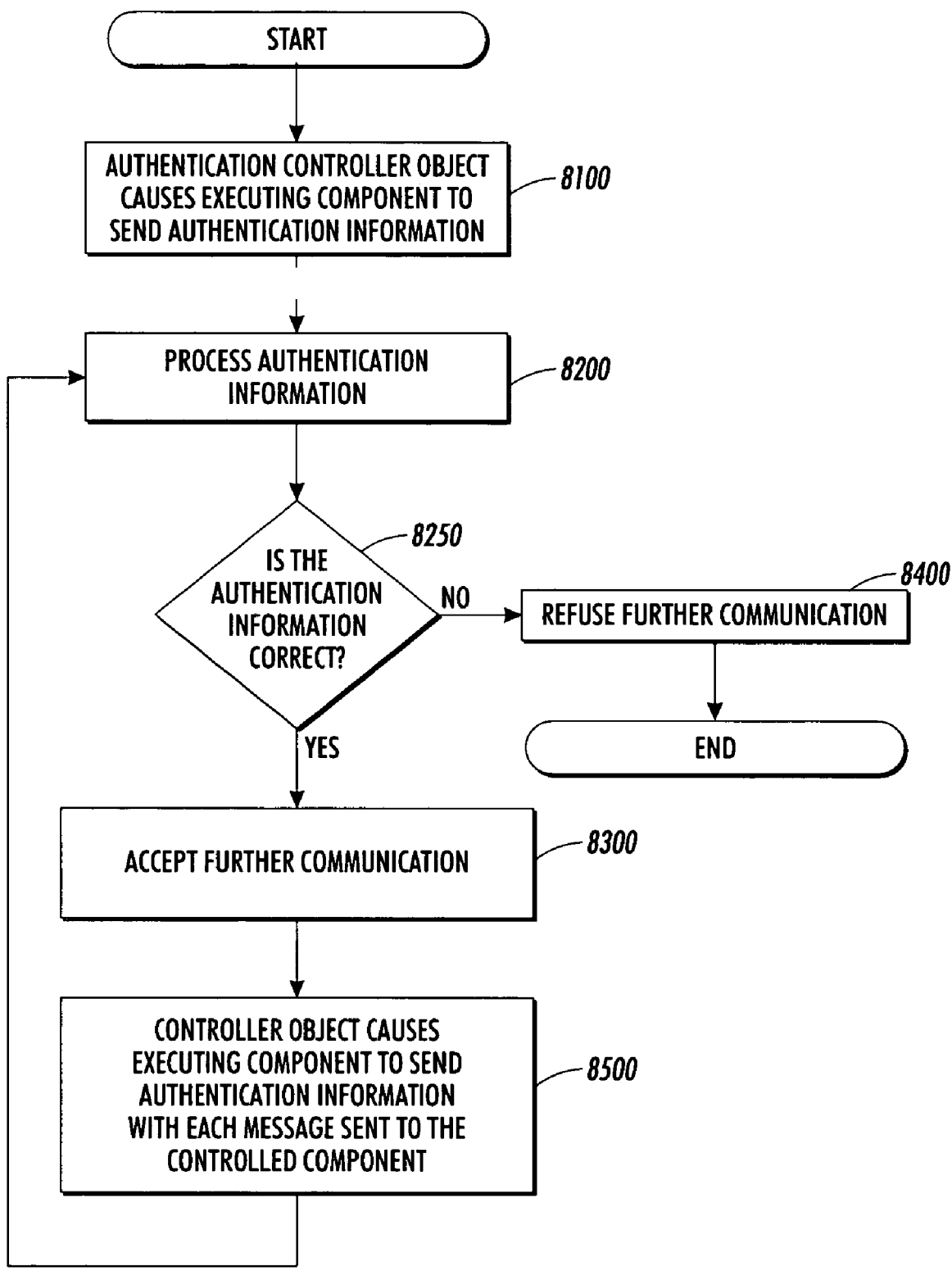

Referring to FIG. 12, at step 8100, the PDA 14 accesses the authentication controller object 60(2) which causes the PDA 14 to execute the authentication instructions 62(2) included in the authentication controller object 60(2). As the PDA 14 executes the instructions 62(2), the executed instructions direct the PDA 14 to generate one or more authentication user interfaces for obtaining information from a user of the PDA 14 and to provide the obtained information to the server 12, although the executed instructions may direct the PDA 14 to send information identifying the PDA 14, such as a serial number or cryptographic key. The information comprises authentication information, which the server 12 can use to authenticate the identity of the user of PDA 14 and/or the PDA 14 itself, although the information provided by the PDA 14 can be used by the server 12 to establish access privileges of the PDA 14.

For instance, by executing the authentication controller object 60(2), the executed instructions may direct the PDA 14 to display a user interface that asks the user of PDA 14 for a password, although any number of techniques may be used, such as requesting an identifying serial number from the PDA 14. The information provided by the user of the PDA 14 is communicated back to the server 12 using a TCP/IP communication protocol for further processing as described herein, although other protocols can be used, such as RPC, CORBA, SOAP and RMI.

At step 8200, the server 12 processes the authentication information collected at step 8100 and sent from the PDA 14 to confirm the identity of the user of PDA 14, although other credentials may be used, such as certificates and shared secrets. For instance, where password information is provided by the PDA 14, the server 12 compares password information for the PDA 14 stored in the server memory 22 with the password information provided to the server 12 at step 8100. Where the server 12 receives authentication information from the PDA 14 in connection with a user interaction message upon execution of step 8500, described further herein below, the server 12 process the authentication information in the same manner described herein.

At decision box 8250, if the server 12 determines that the information (e.g., password information) sent from the PDA 14 corresponds to the information stored in the server memory 22, then the YES branch is followed and step 8300 is performed. At step 8300, the server 12 accepts further communications from the PDA 14 as a result of the PDA 14 executing the controller instructions 64(2) at step 8000, although the server 12 may instead provide the server controller 22(2) to the PDA 14 or the server 12 may accept further communications from the PDA 14 in connection with the server controller object 22(2) where the object 22(2) is provided to the PDA 14 along with the authentication object 60(2).

At step 8500, the instructions 62(2) in the authentication controller object 60(2) that are executed by the PDA 14 optionally direct the PDA 14 to provide authentication information along with each of the messages containing the user interactions for controlling the server 12 which are communicated back to the authentication controller object 60(1) at the server 12, although the authentication information and the user interaction messages may be sent to the server controller object 22(1) where the object 22(2) is provided to the PDA 14 in addition to the authentication object 60(2).

If the server 12 determines at decision box 8250 that the information (e.g., password information) sent from the PDA 14 does not correspond to the information stored in the server memory 22, then the NO branch is followed and step 8400 is performed. At step 8400, the server 12 rejects any further communications from the PDA 14 in connection with the PDA 14 executing or attempting to execute the controller instructions 64(2) at step 8000, although the server 12 may simply not provide the server controller object 22(1) to the PDA 14 where the authentication controller object 70(2) is provided before the server controller object 22(2) or the server 12 may refuse communications from the PDA 14 in connection with the server controller object 22(1) where the server controller object 22(2) is provided with the authentication controller object 60(2).

An alternative portion of the process for the operation of the system 10 to securely control communication in accordance with embodiments of the present invention will now be described with reference to FIGS. 5 and 14-15. In this example, the components which receive controller objects, such as PDA 14, may desire authenticating the source of the controller objects and confirming that the objects have not been tampered with. Steps 1000-7000 are performed in the same manner described above, except step 7000 is performed in conjunction with steps 7100-7300 as described herein. Thus, in this example, the certificate granting system 70 creates a certificate authority ("CA") digital certificate 72, shown in FIG. 15, which conforms to the X.509 standard and includes various types of information, such as system 70 identification information (e.g., name, serial number), expiration dates and a copy of the system 70's public key, although other types of certificates can be used, such as XML, SPKI, WTLS and attribute certificates. The certificate granting system 70 provides the CA digital certificate 72 to the PDA 14, and the PDA 14 stores the certificate 72 in a protected area of the PDA memory 32.

Further in this example, the certificate granting system 70 creates a server digital certificate 73 for the server 12. The server digital certificate 73 is the same as the CA digital certificate 72, except the certificate 73 also includes the server 12's public key and other server 12 credentials, although other types of certificates (e.g., XML, SPKI, WTLS and attribute certificates) can be used. The certificate granting system 70 provides the server digital certificate 73 to the server 12, and the server 12 stores the certificate 73 in a protected area of the server memory 22.

The server 12 digitally signs the server controller object 22(1) to create the signed server controller object 22(1)" bearing cryptographic digital signature 74(1) using a cryptographic key of the server 12 and utilizing a signed Java code scheme, although other schemes may be used, such as MS Authenticode™ and other intermediary trusted third parties can sign the object 22(1) where standard certificate chaining techniques are employed. At step 7000, the server 12 associates the signed server controller object 22(1)" and server digital certificate 73, instead of the server controller object 22(1), with the data transfer session object 20(1). The PDA 14 has access to the signed server controller object 22(1)" and server digital certificate 73 through the data transfer session object 20(2), shown as signed server controller object 22(2)" and server digital certificate 73'.

Figure 14:
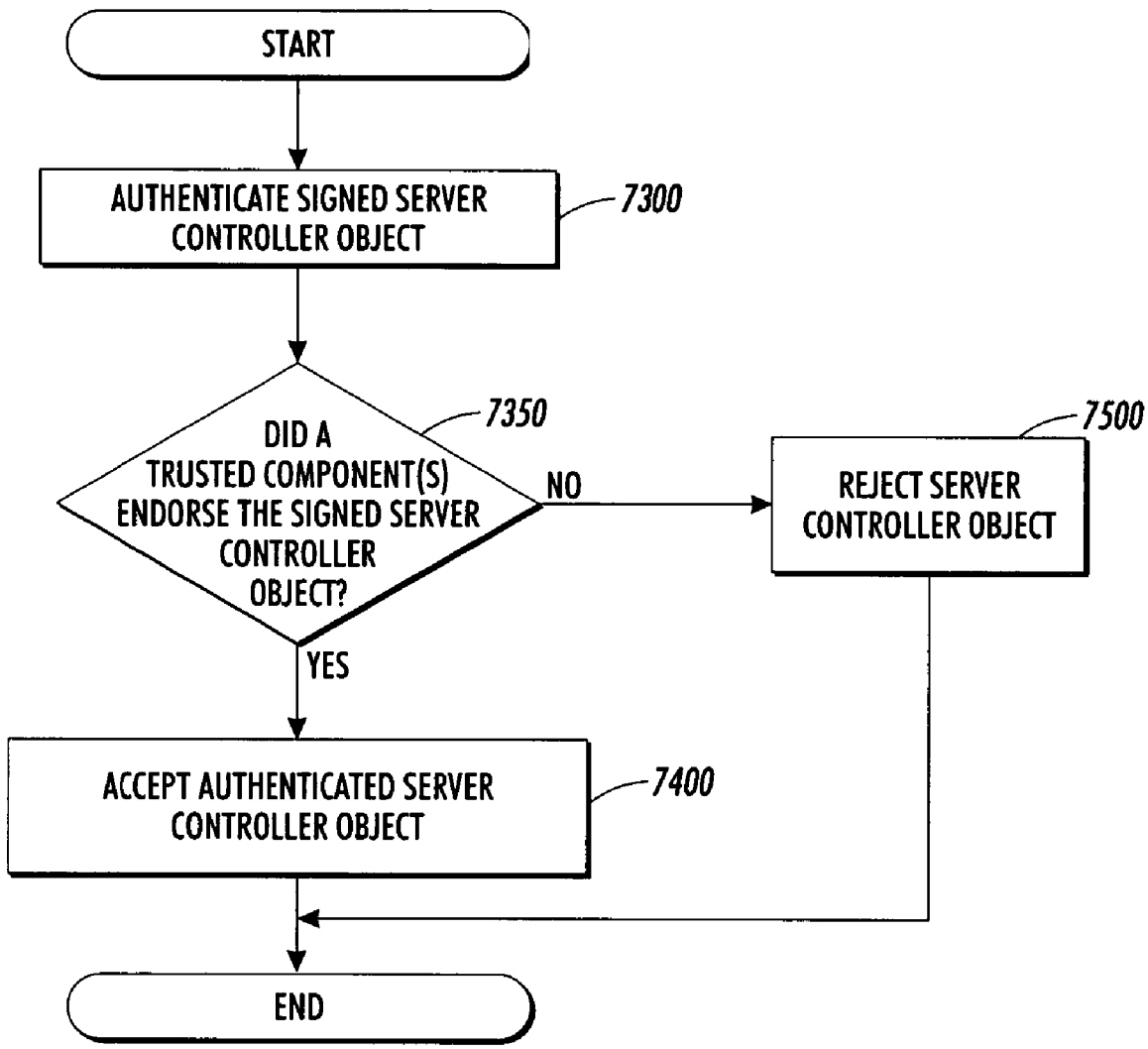
Figure 15:
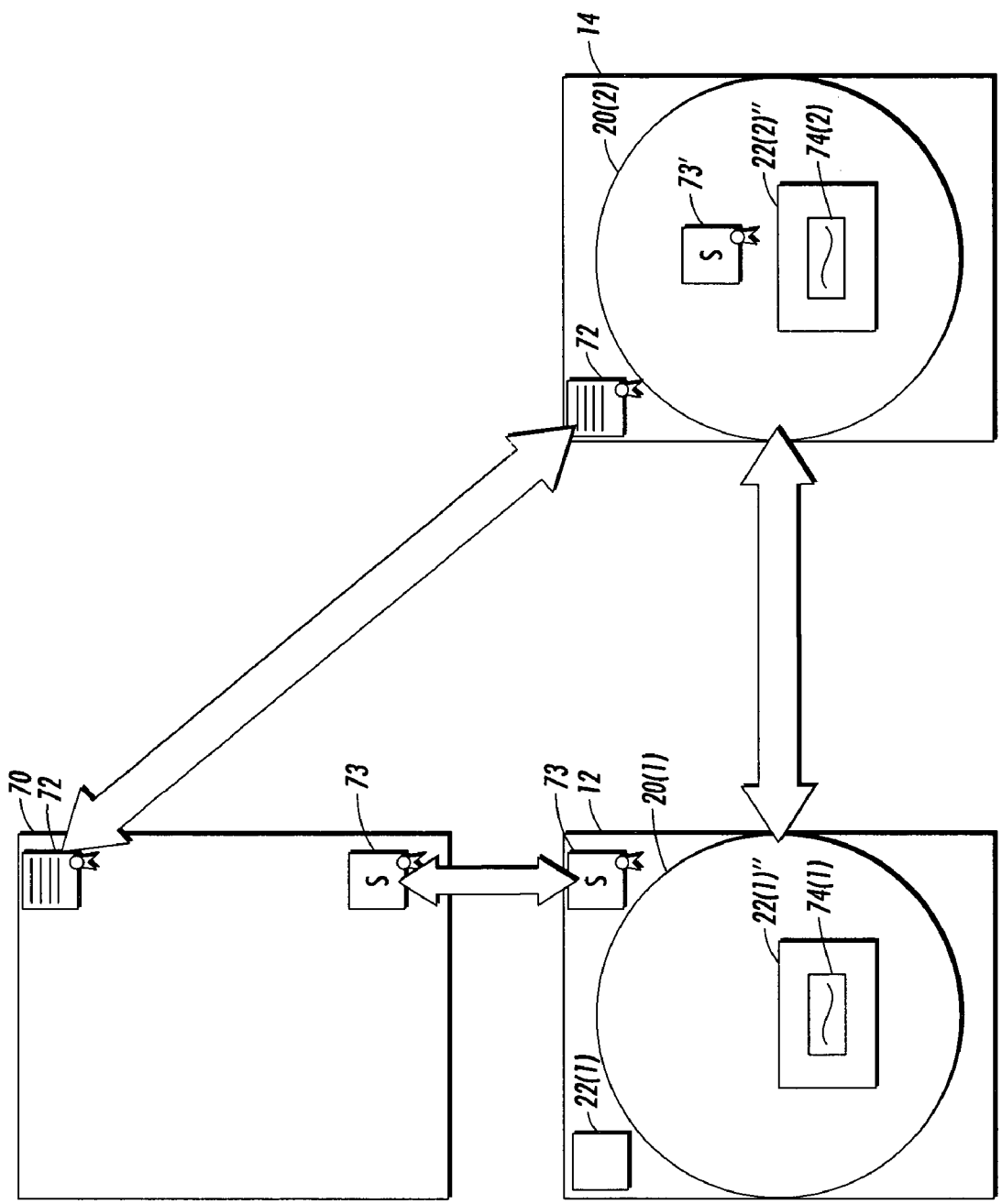

Referring to FIG. 14 and at step 7300, PDA 14 verifies that the digital signature 74(2) in the signed controller object 22(2)" is authentic. In particular, the PDA 14 uses standard cryptographic techniques with the public key from the server digital certificate 73' to verify that the signature 74(2) on the signed controller object 22(2)" was computed by the holder of the corresponding cryptographic private key, which is the server 12 in this example, although the PDA 14 may confirm the authenticity of signature 74(2) by determining whether another trusted authority and/or one or more intermediaries computed the signature 74(2) employing standard certificate chaining techniques. Further, the PDA 14 may use the CA digital certificate 72 to confirm that the server digital certificate 73' was issued by a trusted source (i.e., certificate granting authority 70) and/or vouched for by one or more intermediaries where standard certificate chaining techniques are employed.

At decision box 7350, if the PDA 14 determines that the digital signature 74(2) included in the signed controller object 22(2)" was generated using the private key corresponding to the public key included in the server digital certificate 73', then the YES branch is followed and step 7400 is performed, although the YES branch may be followed if the PDA 14 determines that the signature 74(2) was computed by another trusted authority and/or one or more intermediaries where standard certificate chaining techniques are employed. At step 7400, the PDA 14 accepts the signed server controller object 22(2)" and step 8000 is performed in the same manner described above. This allows the PDA 14 to ensure that only trusted, signed controller objects 22(2)" are accepted and executed by the PDA 14.

On the other hand, if the PDA 14 determines at decision box 7350 that the digital signature 74(2) included in the signed controller object 22(2)" was not generated using the private key corresponding to the public key included in the server digital certificate 73', then the NO branch is followed and step 7500 is performed, although the NO branch may also be followed if the PDA 14 determines that the signature 74(2) was not computed by another trusted authority and/or one or more intermediaries where standard certificate chaining techniques are employed. At step 7500, the PDA 14 rejects the signed server controller object 22(2)", and thus the PDA 14 does not execute the instructions in the signed server controller object 22(2)" during step 8000. Again, this allows the PDA 14 to ensure that only trusted, signed controller objects 22(2)" are accepted and executed by the PDA 14.

As described above in connection with one or more embodiments, the system 10 enables arbitrary components to interact in an ad hoc manner for controlling aspects of communications without requiring prior knowledge of each other. Moreover, the system 10 enables these arbitrary components to dynamically provide each other with controller objects that include instructions for generating user interfaces. The components can execute these instructions as needed to enable the recipients to control the communication without needing to have specific, prior knowledge of the components creating or providing the interfaces or the interfaces themselves. As a result, for example, the PDA 14 can control a projector 16 that projects the slides of a slide show program to adjust the brightness of the projection.

Further, the system 10 advantageously utilizes various cryptographic techniques in connection with the controller objects to ensure that the components are controlled in a secure manner. It should be appreciated that while several alternative portions of the process for securely controlling communication have been described above, these portions may be practiced in combination with each other.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A system comprising:
   a controller module comprising instructions for controlling a first component, wherein the controller module is provided dynamically;
   a storage system storing a set of semantic programming that enables a second component to understand the semantics of a set of universal interfaces associated with the controller module; and
   the second component with a security system that interacts with the controller module to implement a security protocol before the second component can control the first component based on executing the instructions in the controller module, wherein the controller module provides secure control of communications between the first component and the second component, and wherein the security system decrypts an encrypted controller module to perform a portion of the security protocol, the second component controlling the first component based upon the execution of the instructions in the controller module without the second component having prior knowledge of the first component, wherein the stored set of semantic programming enables secure ad hoc interaction between the first and second components.

2. The system as set forth in claim 1 wherein a portion of the instructions in the controller module comprises authentication instructions which when executed by the second component cause the second component to send authentication information to the first component to perform a portion of the security protocol.

3. The system as set forth in claim 2 wherein the authentication information is associated with an operator of the second component, the first component authenticates the operator using the authentication information to perform another portion of the security protocol.

4. The system as set forth in claim 2 wherein the first component authenticates the second component using the authentication information to perform another portion of the security protocol, wherein upon unsuccessful authentication the first component rejects messages from the second component and upon successful authentication the first component accepts the messages from the second component, the messages being associated with controlling the first component.

5. The system as set forth in claim 2 wherein the first component authenticates each of a plurality of messages received from the second component, the messages being associated with controlling the first component, wherein upon unsuccessful authentication of at least one of the messages the first component rejects the at least one message and upon successful authentication of another at least one of the messages the first component accepts the other at least one message from the second component.

6. The system as set forth in claim 1 wherein the security system uses a cryptographic key associated with one of the first component, the second component and a third component to decrypt the encrypted controller module.

7. The system as set forth in claim 1 wherein the security system authenticates the controller module using at least one of a digital certificate, a public key and a shared secret to perform a portion of the security protocol.

8. The system as set forth in claim 1 wherein the security system rejects the controller module upon determining that a cryptographic signature associated with the controller module is not associated with a trusted component to perform a portion of the security protocol.

9. The system as set forth in claim 1 wherein the controller module is encrypted using a cryptographic key from one of the first component, the second component and a third component.

10. The system as set forth in claim 1 wherein the controller module comprises a cryptographic signature associated with at least one of the first component and one or more third components.

11. A method comprising:
providing a controller module comprising instructions for controlling a first component, wherein the controller module is provided dynamically;
storing a set of semantic programming that enables a second component to understand the semantics of a set of universal interfaces associated with the controller module; and
interacting with the controller module to implement a security protocol before the second component can control the first component based on executing the instructions in the controller module, wherein the controller module provides secure control of communications between the first component and the second component without the second component having prior knowledge of the first component, wherein the stored set of semantic programming enables secure ad hoc interaction between the first and second components;
wherein the interacting with the controller module to implement the security protocol further comprises:

decrypting an encrypted controller module to perform a portion of the security protocol, and
controlling the first component based upon the execution of the instructions in the controller module.

12. The method as set forth in claim 11 wherein the interacting with the controller module to implement the security protocol further comprises:
executing a portion of the instructions in the controller module that comprises authentication instructions;
sending authentication information from the second component to the first component to perform a portion of the security protocol based on the executed authentication instructions.

13. The method as set forth in claim 12 further comprising: authenticating an operator of the second component using the authentication information to perform another portion of the security protocol.

14. The method as set forth in claim 12 further comprising:
authenticating the second component using the authentication information to perform another portion of the security protocol; and
rejecting messages from the second component upon unsuccessful authentication and accepting the messages from the second component upon successful authentication, the messages associated with controlling the first component.

15. The method as set forth in claim 12 further comprising:
authenticating each of a plurality of messages from the second component, the messages associated with controlling the first component; and
rejecting at least one of the messages from the second component upon unsuccessful authentication of the at least one message and accepting another
at least one of the messages upon successful authentication of the other at least one message.

16. The method as set forth in claim 11 further comprising using a cryptographic key associated with one of the first component, the second component and a third component to decrypt the encrypted controller module.

17. The method as set forth in claim 11 further comprising authenticating the controller module using at least one of a digital certificate, a public key and a shared secret to perform a portion of the security protocol.

18. The method as set forth in claim 11 further comprising rejecting the controller module upon determining that a cryptographic signature associated with the controller module is not associated with a trusted component to perform a portion of the security protocol.

19. The method as set forth in claim 11 further comprising encrypting the controller module using a cryptographic key from one of the first component, the second component and a third component.

20. The method as set forth in claim 11 wherein the controller module comprises a cryptographic signature associated with at least one of the first component and one or more third components.

21. A computer-readable medium having stored thereon instructions, which when executed by at least one processor, causes the processor to perform:
providing a controller module comprising instructions for controlling a first component, wherein the controller module is provided dynamically;

storing a set of semantic programming that enables a second component to understand the semantics of a set of universal interfaces associated with the controller module; and interacting with the controller module to implement a security protocol before the second component can control the first component based on executing the instructions in the controller module, wherein the controller module provides secure control of communications between the first component and the second component without the second component having prior knowledge of the first component, wherein the stored set of semantic programming enables secure ad hoc interaction between the first and second components;

wherein the interacting with the controller module to implement the security protocol further comprises:
  decrypting an encrypted controller module to perform a portion of the security protocol, and
  controlling the first component based upon the execution of the instructions in the controller module.

22. The medium as set forth in claim 21 wherein the interacting with the controller module to implement the security protocol further comprises:
  executing a portion of the instructions in the controller module that comprises authentication instructions;
  sending authentication information from the second component to the first component to perform a portion of the security protocol based on the executed authentication instructions.

23. The medium as set forth in claim 22 further comprising authenticating an operator of the second component using the authentication information to perform another portion of the security protocol.

24. The medium as set forth in claim 22 further comprising:
  authenticating the second component using the authentication information to perform another portion of the security protocol; and
  rejecting messages from the second component upon unsuccessful authentication and accepting the messages from the second component upon successful authentication, the messages associated with controlling the first component.

25. The medium as set forth in claim 22 further comprising:
  authenticating each of a plurality of messages from the second component, the messages associated with controlling the first component; and
  rejecting at least one of the messages from the second component upon unsuccessful authentication of the at least one message and accepting another at least one of the messages upon successful authentication of the other at least one message.

26. The medium as set forth in claim 21 further comprising using a cryptographic key associated with one of the first component, the second component and a third component to decrypt the encrypted controller module.

27. The medium as set forth in claim 21 further comprising authenticating the controller module using at least one of a digital certificate, a public key and a shared secret to perform a portion of the security protocol.

28. The medium as set forth in claim 21 further comprising rejecting the controller module upon determining that a cryptographic signature associated with the controller module is not associated with a trusted component to perform a portion of the security protocol.

29. The medium as set forth in claim 21 further comprising encrypting the controller module using a cryptographic key from one of the first component, the second component and a third component.

30. The medium as set forth in claim 21 wherein the controller module comprises a cryptographic signature associated with at least one of the first component and one or more third components.

* * * * *